(12) United States Patent
Frey et al.

(10) Patent No.: US 10,673,657 B2
(45) Date of Patent: Jun. 2, 2020

(54) TRANSCEIVER UNIT FOR TRANSMITTING DATA VIA A DIFFERENTIAL BUS

(71) Applicant: MELEXIS TECHNOLOGIES NV, Tessenderlo (BE)

(72) Inventors: Michael Frey, Erfurt (DE); Thomas Freitag, Plaue (DE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 0 days.

(21) Appl. No.: 16/170,333

(22) Filed: Oct. 25, 2018

(65) Prior Publication Data

US 2019/0132159 A1 May 2, 2019

(30) Foreign Application Priority Data

Oct. 26, 2017 (EP) ..................................... 17198616

(51) Int. Cl.
| | | |
|---|---|---|
| *H04L 25/02* | (2006.01) | |
| *G06F 13/36* | (2006.01) | |
| *H04L 12/40* | (2006.01) | |
| *G06F 13/40* | (2006.01) | |
| *G06F 13/42* | (2006.01) | |

(52) U.S. Cl.
CPC .......... *H04L 25/0276* (2013.01); *G06F 13/36* (2013.01); *G06F 13/4022* (2013.01); *G06F 13/42* (2013.01); *H04L 12/40169* (2013.01); *H04L 25/0272* (2013.01); *H04L 25/0282* (2013.01); *H04L 2012/40215* (2013.01)

(58) Field of Classification Search
CPC ...... G06F 13/36; G06F 13/42; G06F 13/4072; H04L 2012/40215
See application file for complete search history.

(56) References Cited

U.S. PATENT DOCUMENTS

| | | | |
|---|---|---|---|
| 6,154,061 A | 11/2000 | Boezen et al. | |
| 6,400,217 B1 * | 6/2002 | Bhandari | G11B 20/10009 327/337 |
| 7,514,965 B2 * | 4/2009 | Nishimura | H03K 5/2481 327/53 |
| 7,567,105 B2 * | 7/2009 | Trichy | G06F 13/4072 326/86 |

(Continued)

OTHER PUBLICATIONS

European Office Communication from EP Application No. 17198616. 9, dated Jan. 3, 2018.

*Primary Examiner* — Brian T Misiura
(74) *Attorney, Agent, or Firm* — Workman Nydegger

(57) ABSTRACT

A transmitter for establishing communication between a device and a differential network bus includes current driving means connected to each of the two conduction lines of the differential network bus, through a first and second conduction paths of the transmitter; at least one unidirectional current regulator for extracting a first current equal to a known ratio of a parasitic current circulating through the first conduction path, with a direction inverse to the driving current through the conduction path connected to one of the lines of the differential bus; means for obtaining, from the first current, a second current with a magnitude equal to the original magnitude of the parasitic current; and means for introducing the second current into the second conduction path connected to the other line of the differential bus.

12 Claims, 8 Drawing Sheets

(56) References Cited

U.S. PATENT DOCUMENTS

| | | | |
|---|---|---|---|
| 8,040,160 B2* | 10/2011 | Avalur | G06F 13/4072 |
| | | | 327/108 |
| 8,115,537 B2* | 2/2012 | Chung | H02M 1/15 |
| | | | 327/551 |
| 9,156,343 B2* | 10/2015 | Philippart | H01G 11/20 |
| 9,742,287 B2* | 8/2017 | Rieux-Lopez | H02M 3/33507 |
| 9,989,564 B2* | 6/2018 | Abhyankar | H02M 1/32 |
| 10,127,186 B2* | 11/2018 | Walker | H04L 25/0274 |
| 10,355,876 B2* | 7/2019 | Kishigami | |
| 2006/0158815 A1 | 7/2006 | De Haas | |
| 2014/0009133 A1* | 1/2014 | Kalogerakis | H03K 19/01750 |
| | | | 323/282 |
| 2014/0355158 A1 | 12/2014 | Metzner et al. | |
| 2017/0199837 A1 | 7/2017 | Walker et al. | |
| 2018/0041358 A1* | 2/2018 | Kishigami | H04L 43/0823 |

* cited by examiner

TRANSCEIVER UNIT FOR TRANSMITTING DATA VIA A DIFFERENTIAL BUS

FIELD OF THE INVENTION

The present invention relates to the field of differential communication networks. More specifically it relates to methods and devices for connecting a bus with control nodes.

BACKGROUND OF THE INVENTION

In modern integrated technology, communication between a plurality of devices, such as master devices, slaves, etc is often required. A typical example would include communication between a controller in a vehicle and the different sensors, functional and passive systems, illumination systems, etc. For example, communication can be established between two or more nodes or devices via a differential network bus.

An example of a differential communication network, typically used in automotive applications, is a Controller Area Network (CAN), to be used as a way to reduce the amount of copper wiring by signal multiplexing. Over time, requirements have been expanded to the field of electromagnetic compatibility.

A simple signal transmission scheme is shown in the upper graph 109 of FIG. 1. In common voltage (or recessive status), both the CAN high CANH and CAN low CANL bus lines have a same signal level 101 (e.g. same voltage). At dominant status, a predetermined voltage difference 102 is introduced between the CAN high CANH and CAN low CANL conduction lines. The signals in both lines CANH, CANL can be then compared, and any parasitic signal introduced in both lines is compensated.

The voltage levels on the bus lines should comply with the specification of the differential network in order to guarantee a correct functioning. Moreover, they should be very symmetric, in order to have low electromagnetic emissions via the bus lines. However, in automotive environments, the bus lines usually pick up electromagnetic disturbances, either from e.g. neighboring wires which may carry high currents (or current changes), via the supply lines of the connected devices, via other coupling mechanisms, etc.

The lower graph 110 in FIG. 1 shows a prior art transceiving unit 111 connected to a CAN bus 112. The transceiving unit 111 may be integrated in a device requiring communication (a CAN node). The receiver Rx 113 of the transceiving unit 111 interprets the voltage information on the bus lines CANH, CANL, and converts that to a received signal 114, which may be further used by the device. The device may require transmitting data, instructions or in general signals through the CAN bus 112. The device generates a transmit signal 115, and a transmitter Tx 116 of the transceiving unit 111 converts said signal to voltage levels on the bus lines CANH, CANL of the bus 112. The signal may be interpreted further by receivers of the rest of the connected devices and/or nodes (not pictured) in the system. Rcan 117 represents the bus impedance. They are e.g. discrete resistors in order to give the network a defined condition. They are typically assembled at the first and the last network connection point and they are present between the bus lines CANH, CANL. The total network impedance may be specified with 60 Ohm total.

A node may further include a controller, such as a CPU or a microcontroller, and a network controller, which is usually an integral part of the CPU or microcontroller, for controlling provision of the signals required from instructions and vice versa.

In environments with a high level of electromagnetic noise, the network bus can be affected by the noise. Typically, automobile implementations of communication networks are considered one of these electromagnetically "noisy" environments. For example, undesired high-frequency current spikes in a differential interconnect network may occur, when the wiring harness of the interconnect network is exposed to electromagnetic disturbances.

These disturbances will also be transported to the transceiving unit of connected members of the differential network, and will interact with elements that are part of the transmitter thereof (e.g. diodes). Further, the unit and its elements do not always have an ideal behavior, for example when switching from a conductive mode into a non-conductive mode. This may lead to additional current components and asymmetry of the signal. As a result, the receivers for the detection of the differential signal sent by the transmitters might detect these additional current components and interpret a wrong signal condition. This may happen within a relatively wide frequency range of electromagnetic disturbance. The malfunctioning of the receivers can lead to a wrong system behavior.

U.S. Pat. No. 6,154,061A describes a bus driver having good symmetry. It shows a circuit arrangement including extra transistors which are scaled copies of the transistors used for driving the signal into the bus. These carry the same current, which delivers a high symmetry and low electromagnetic emissions of the bus lines. However, if the main output driving transistors receive incoming EM interferences, the driving signal may be affected, reduced or even cut off.

US 2017/0199837 describes a transmitter unit including a Miller capacitor for edge control, which allows generating a setpoint voltage characteristic on a differential bus, and transmit it via current mirrors to the bus. Although such transmitter unit reduces line-related emissions in the bus, the improvement does not relate to protecting the line against interference, rather only to improvement in asymmetries during switching edges, when switching from dominant to recessive state.

Because of that, there is a need to provide a robust transmitting unit.

SUMMARY OF THE INVENTION

It is an object of embodiments of the present invention to provide a transmitter, transceiver and system for differential communication, as well as a method of signal transmission through a differential communication network, with a robust signal transmission, effective shielding against electromagnetic (EM) interference and incoming electromagnetic disturbances.

It is an advantage of embodiments of the present invention that it provides a compensating current to recover the influence of the reverse recovery current of rectifying devices (e.g. current blocking diodes) during exposure of electromagnetic disturbances is possible.

In a first aspect, a transmitter for establishing communication between a device and a differential network bus is provided. The transmitter includes:

current driving means connected to each of the two conduction lines (CANH, CANL) of the differential network bus, through a first and second conduction paths of the transmitter, at least one unidirectional current regulator for extracting a first current, the first current being equal to a known ratio of a parasitic current circulating through the first conduction path with a direction inverse to the driving current through the conduction connected to one of the lines of the differential bus, means for obtaining, from said first current, a second current with a magnitude equal to the original magnitude of the parasitic current, means for introducing the second current into the second conduction path connected to the other line of the differential bus.

It is an advantage of embodiments of the present invention that a transmitter is obtained with good shielding against any parasitic current and EM disturbance, e.g. external disturbance, causing signal asymmetry.

In some embodiments of the present invention, the means for obtaining, from said first current, the second current, comprises means for scaling said first current by multiplication of the first current by the inverse of the known ratio.

In some embodiments of the present invention, at least one conduction path of the transmitter comprises at least one rectifying device for reducing reverse currents flowing to the current driving means.

It is an advantage of embodiments of the present invention that a transmitter with robust driving signal is obtained. It is a further advantage that shielding against antenna interferences is improved.

In some embodiments of the present invention, the at least one unidirectional current regulator comprises a BJT, advantageously providing a straightforward implementation. However, the present invention is not limited thereto. For example, in some embodiments, the at least one unidirectional current regulator comprises a MOSFET and a boost stage, which may be alternatively used to overcome the shortcomings of BJT manufacture. It is an advantage of embodiments of the present invention that the MOSFETs are compact and robust devices with low sensitivity to temperature changes, compared to other transistors.

It is an advantage of embodiments of the present invention that a simple setup is obtained.

In some embodiments of the present invention, the means for scaling and introducing the extracted current into the conduction path comprises at least a current mirror. In some embodiments, the current mirror can be adjustable.

It is an advantage of embodiments of the present invention that the predetermined mirror ratio can be made equal to the required ratio to recreate the original parasitic current.

Embodiments of the present invention further provide a transceiver comprising a transmitter according to embodiments of the first aspect of the present invention. It is an advantage of embodiments of the present invention that a compact device can be provided.

Embodiments of the present invention further provide a communication system comprising at least a differential communication network, further comprising a transmitter according to embodiments of the first aspect of the present invention.

It is an advantage of embodiments of the present invention that a robust and symmetric signal communication can be established in a differential communication system.

In a further aspect, the present invention includes a method for driving a differential communication bus including two conduction lines (CANH, CANL) connected to each of a first and second conduction paths of at least one transmitter. The method comprises:

applying a driving current through each conduction path of the transmitter, thus providing a differential driving signal, obtaining a first current equal to a known ratio of a parasitic current circulating through the first conduction path with a direction inverse to the driving current, obtaining, from said first current, a second current with a magnitude equal to the magnitude of the parasitic current, introducing the second current into at least the second conduction path of the transmitter.

It is an advantage of embodiments of the present invention that asymmetric currents, undesired high frequency current spikes during electromagnetic disturbance in transmitters and/or transceiving units, and other parasitic currents can be compensated in differential networks such as CAN.

In some embodiments, obtaining the second current from the first current comprises upscaling the first current by multiplying it with the inverse of the known ratio. In further embodiments, multiplying the first current comprises introducing the first current into at least one current mirror with a mirror ratio equal to the inverse of the known ratio.

It is an advantage of embodiments of the present invention that an accurate tuning of the mirror ratio can be provided, allowing good matching of the parasitic current.

In some embodiments of the method of the present invention, applying a driving current comprises applying a driving current through a rectifying device being connected to any or both the conduction paths.

It is an advantage of embodiments of the present invention that the risk of disturbing, reducing and/or cutting off the driving current (due to parasitic currents in the bus) is reduced.

In further embodiments of the present method, introducing the second current into the at least second conduction path comprises injecting the current at the cathode of a rectifying device connected to the at least second conduction path.

It is an advantage of embodiments of the present invention that currents stemming from discharges of rectifiers, e.g. reverse recovery currents from diodes, can be reduced and compensated.

The method of the present invention can be used for compensating current spikes at frequencies between 1 MHz and 25 MHz. It is an advantage of embodiments of the present invention that it can compensate high frequency current spikes, with no need of further filter mechanisms.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
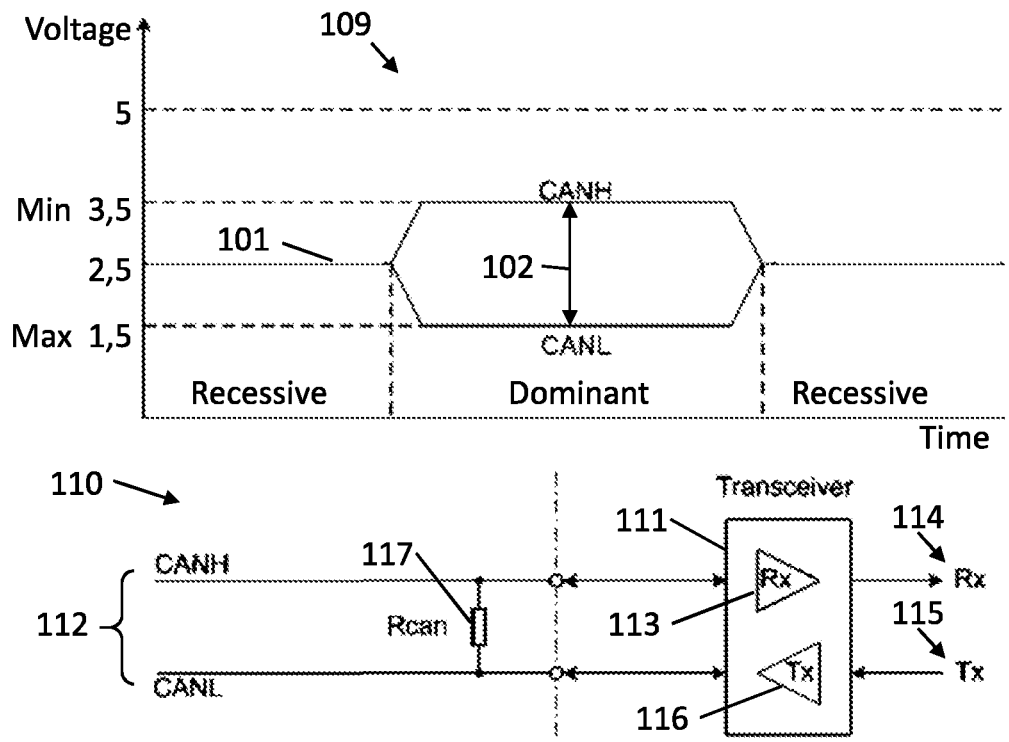
FIG. 1 illustrates voltage levels of known Controller Area Networks (CAN) and a prior art CAN transceiver.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to a "differential bus", reference is made to a bus comprising a first and a second conduction line, which may be conduction paths printed in a circuit, wires, or any other suitable means for transporting a signal such as a current, such that differential communication is obtained. A differential bus is the main signal path of a differential communication network. An example of such network is the Controller Area Network (CAN), wherein the first and second conduction lines are known as CANH and CANL, as explained in the background section with reference to the upper graph 109 of FIG. 1. Although the present invention describes an implementation in CAN, it is not limited to CAN, and it can be applied to any suitable differential communication network.

Where in embodiments of the present invention reference is made to "transceiver", or "transceiving unit", reference is made to a unit or device which includes signal reception means (or a receiver, for short), and signal transmission means (or a transmitter). The receiver provides received network information to a device connected thereto, and the transmitter provides information from a connected device to the network.

Figure 2:
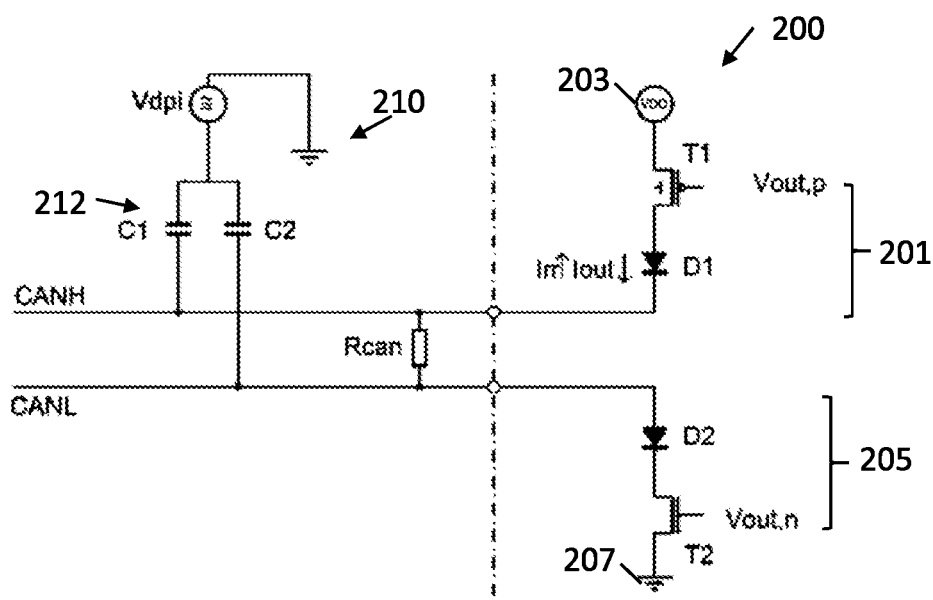
FIG. 2 illustrates the output stage of a prior art transmitter, under exposure of DPI.

FIG. 2 shows the output stage of a prior art transmitter 200 including driving means for introducing a signal in the bus. A first conduction path 201 of the unit includes a first driving transistor T1, of a first conductivity type, connected to a first reference potential 203 (e.g. a VDD supply), which may provide a dominant level via a first diode D1 to the bus line CANH. A second conduction path 205 of the unit includes a second transistor T2, which may have a second conductivity type opposite to the first transistor T1, connected to a second reference potential 207 different from the first, for example to Ground (GND), which may provide, via a second diode D2, a dominant level to the bus line CANL. These transistors T1, T2 may be part of the driving unit of the transmitter 200, being controlled by a CAN controller, e.g. included in a CPU.

If both transistors T1, T2 are switched off, the network is in recessive mode.

If the voltage on the bus line CANH is above the supply voltage VDD, the first diode D1 cuts off the current flow. On the other hand, if the voltage on the bus line CANL is below GND level, the second diode D2 cuts off the current flow. Thus, both diodes D1, D2 behave as blocking diodes.

In order to provide electromagnetic disturbances for test and analysis purposes in a systematic and specified manner to a device or to a network with connected devices, the technique known in the art as Direct Power Injection (DPI) might be used as shown in FIG. 2. The DPI unit 210 may include a voltage source Vdpi, for providing a voltage with tunable frequency and amplitude. The voltage source Vdpi provides, by a capacitive coupling via capacitor set 212 comprising capacitors C1 and C2, electromagnetic disturbances to a network.

Figure 3:
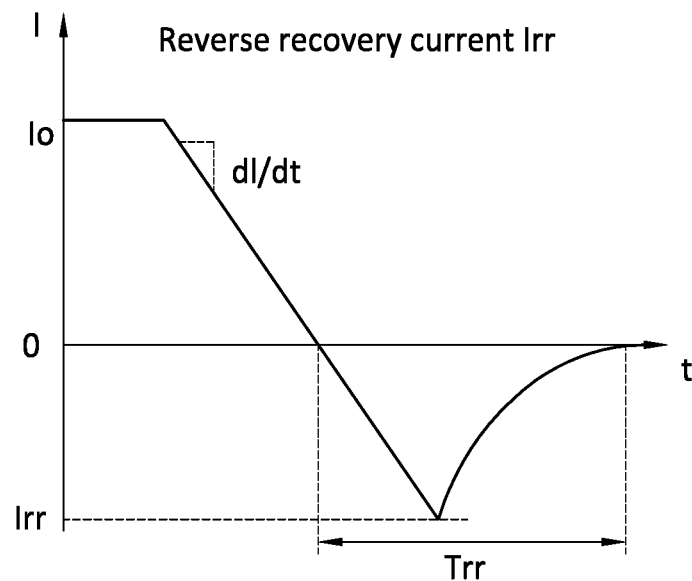
FIG. 3 illustrates the diode characteristics I=f(t) during switching from conductive mode in non-conductive mode

FIG. 3 shows a graph with the current I as a function of time for a diode switching from a conducting phase (I=Io) to a non-conducting phase (I=0). Due to the parasitic junction capacitance of the diode, at switching, the current does not drop immediately from I=Io to I=0, and there is a reverse recovery time Trr in which a non-linear current Irr flows, which discharges the parasitic junction capacitance. During DPI exposure (e.g. as shown in FIG. 2), the low bus line CANL line might run below GND level and the high bus line CANH might go up above VDD level, as explained before. These phenomena might not happen at one and the same time, so that there may be a different voltage over the diodes at a given time. Because the diodes do not cut the current immediately, a non-linear current Irr component might be present in one diode, but not in the other diode. This generates an asymmetrical load on the differential bus lines CANH and CANL during the exposure of the electromagnetic disturbance. This can be considered a major influence in the formation of asymmetric loads. All or most other loads of the bus can be considered to have symmetric nature, see for example the loads of the upper drawing 400 of FIG. 4.

Figure 4:
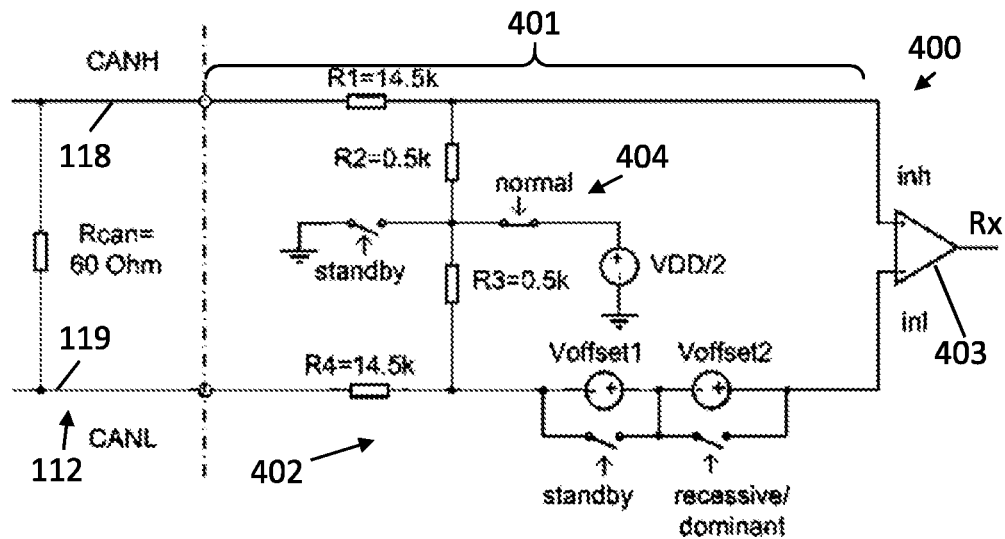
FIG. 4 illustrates a receiver and the voltage levels and corresponding output signal thereof.
Figure 4:
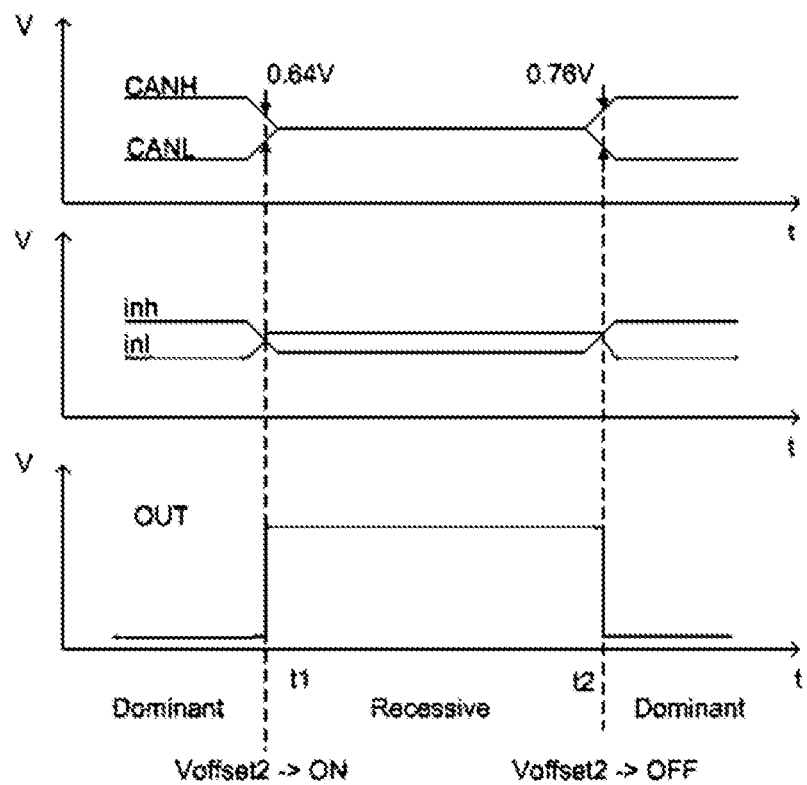

The influence of noise will be explained with reference to FIG. 4. The upper drawing 400 of FIG. 4 shows an exemplary receiver including means for improving stability against noise. The receiver may be integrated in a transceiving unit. This exemplary realization of a receiver comprises two conduction paths 401, 402 connecting the conduction lines CANH, CANL of the bus 112 to a comparator 403. The receiver further comprises a voltage divider 404 between both paths 401, 402.

The total input impedance of, in the example given, 30 k Ohm (R1+R2+R3+R4) is much bigger than the CAN bus network impedance of Rcan 117. For example, in a typical network including two termination resistors of 120 Ohm each, the network impedance Rcan 117 is 60 Ohm, so current flows mainly via Rcan 117. In normal operation mode, the middle point of the voltage divider 404 is stimulated with a voltage of VDD/2. With a VDD of 5V, the midpoint is therefore set to 2.5V. This improves stability of the recessive level 101 on the conduction lines CANH, CANL as shown in the upper graph of FIG. 1.

Further, FIG. 4 shows a differential comparator 403 connected, via R1, to CANH, and via R4 and the offset voltage sources Voffset1 and Voffset2 to CANL. The switching threshold level may be different, depending on whether there is a switch from dominant to recessive mode or from recessive to dominant system, as shown in the graphs at the bottom of FIG. 4. These graphs represent voltage V in function of time t. The first (upper) of these graphs represents the voltage levels at CANH and CANL for the dominant and recessive levels. The second graph shows the voltages on the inputs of the comparator 403 (inputs inh, inl). Due to the resistor dividers in between the circuit represented in the drawing 400 of FIG. 4, these voltages are then lower than the voltages on CANH and CANL. The third, lowest, graph represents the digitized signal. In normal operation, Voffset1 is enabled in other to ensure a differential switching threshold level on CANH-CANL of, for example, 0.64V going from dominant mode to recessive mode. The switchable offset voltage of Voffset2 can be used in order to ensure a differential switching threshold level on CANH-CANL of 0.76V going from recessive mode to dominant mode, as shown in the lower graphs 410 of FIG. 4. These two thresholds serve to set a predetermined hysteresis on the differential comparator, which improves shielding against signal variation due to noise.

Figure 11:
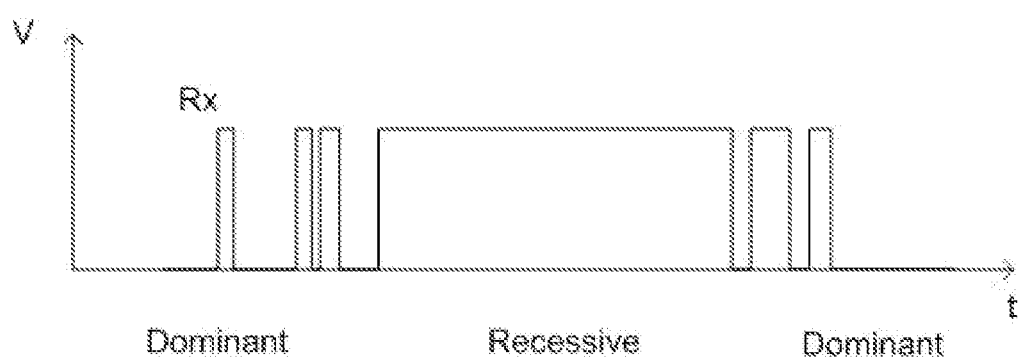
FIG. 11 illustrates exemplary disturbances on output Rx of the receiving unit under DPI exposure.

However, if the conduction lines CANH and CANL are loaded in an asymmetrical way during exposure to electromagnetic disturbance, as explained previously, the receiver may trigger on these wrong voltage levels, and might provide a wrong information on the output Rx of the differential comparator 403. Such behavior is exemplified in FIG. 11, showing voltage levels triggered during the transition from dominant to recessive levels.

The present invention relates to devices and methods that reduce the influence of external electromagnetic noise and disturbances, which cause parasitic currents, spikes and transient currents (particularly those currents which introduce asymmetry in a differential communication network), in signals sent from a transmitting device to a receiving device, both connected to a same network. The present invention can be applied to CAN signaling, e.g. high speed CAN signaling, but it is not limited thereto.

The present invention provides extracting a first current from at least one of the conduction paths connected to the conduction lines of the bus. The first current is proportional (with a known ratio, for example a known fraction) to a parasitic current circulating through that conduction path. From the first current, a second current is obtained, with a magnitude equal to the original magnitude of the parasitic current. Hereto, the first current may be multiplied by the inverse of the known ratio, thereby obtaining a second current equal to the parasitic current of the conduction path. This second current is used for compensating the parasitic current of the first conduction path, by introducing the second current in the other conduction path. Thus, both conduction paths are affected by the same current, thereby improving symmetry.

The parasitic current may include currents flowing in opposite direction to the driving current provided by the transmitter. This may include parasitic currents and/or current spikes due to EM disturbances, antenna effects, etc. It may also include any current which may reduce or alter the signal level of a conduction line of the bus, for example a current opposite to the expected current direction during signal injection.

In a first aspect, the present invention relates to a transmitter (e.g. included in a transceiving unit) for a differential communication network (for example, for a CAN), which improves signal symmetry transmitted via the bus, by reducing or eliminating the influence of such parasitic currents.

The transmitter comprises driving means connected to each conductive line of the bus, there being a conductive path between the bus and the driving means. In embodiments of the present invention, a current regulator is connected to at least one of the driving means. The current regulator is adapted to allow flow of current in one direction, but not in the opposite direction, thus obtaining a "unidirectional current regulator". Said current regulator may comprise transistors, switches, etc. In a particularly simple embodiment, explained below with reference to FIG. 5 and FIG. 6, the current regulator comprises a bipolar-junction transistor (BJT) with a constant voltage applied to base.

In embodiments of the present invention, a rectifying device is included between the driving means (for example, a driving transistor) of the transmitter and the connection to a conduction line of the bus (thus, in the conduction line of a transmitter). For example, the rectifying device or devices may be diodes, diode-connected transistors, etc., acting as blocking diodes. The rectifying device(s) may be adapted to reduce currents run into the supply and/or from the GND, when the driving current runs from the supply to the GND.

In particular, in embodiments of the present invention, a diode D1, D2 is connected as rectifying device between each conduction line CANH, CANL of the CAN bus and each transistor T1, T2 of the transmitter used to produce the differential transmitted signal. The forward direction of the diode D1 in the conduction path connected to CANH may reduce currents toward the respective transistor T1, thus opposite to the direction of the driving current, while in the path connected to CANL the case is the opposite and the forward direction of the diode D2 may reduce currents exiting the transistor T2. However not all currents opposite to the driving current are always blocked, and transient currents may appear through the rectifying devices, as explained earlier.

In embodiments of the present invention, a transient current circulating in the opposite direction of the forward direction of a rectifying device D1, D2 in one conduction path of a transmitter can be reintroduced in the other conduction path, thus improving the symmetry of the signal circulating through the lines, connected to each conduction path of the transmitter, of a differential network bus.

Figure 5:
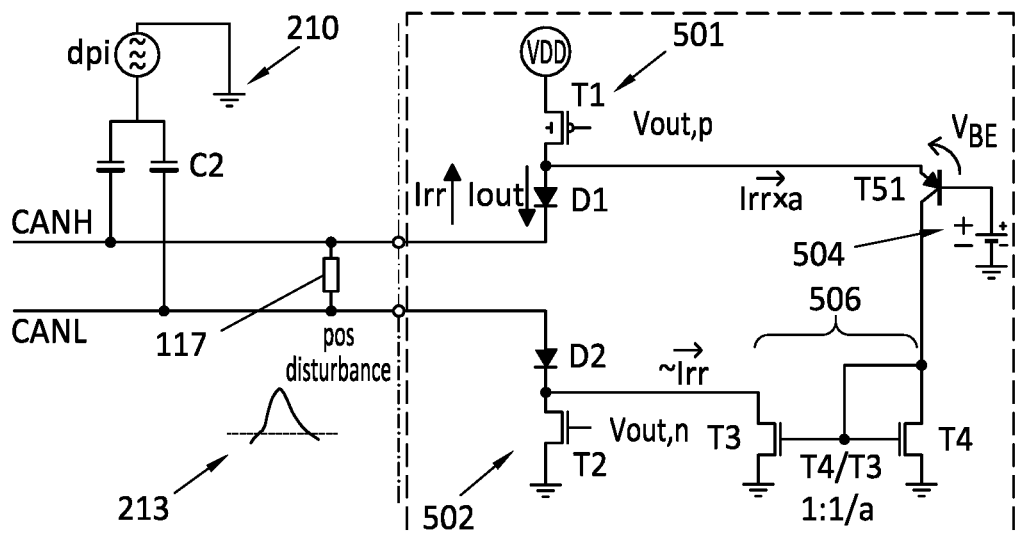
FIG. 5 illustrates a transmitter according to embodiments of the present invention, under exposure of DPI, for compensation of parasitic currents in the high bus line CANH.

FIG. 5 shows an exemplary transmitter 50 according to some embodiments of the present invention, including means for compensation of parasitic currents. The transmitter 50 of FIG. 5 may be integrated in a transceiver. The transmitter includes features analogous to features of the transmitter of FIG. 2, such as a first conduction path 501 including a first transistor T1 whose drain is connected to the CANH via a rectifying diode D1. It also includes a second conduction path 502, including respective transistor T2 whose drain is connected to the CANL via diode D2.

During recessive state, driving transistors T1 and T2 are off, and no current flows via these devices.

During dominant state, a current flows from VDD to the respective high conductive line CANH of the CAN bus via the driving transistor T1, rectifying diode D1 and CAN impedance 117, as well as from GND to the low CAN line CANL via the other driving transistor T2, rectifying diode D2 and impedance 117. As long as no voltage raising occurs on the high CAN bus line CANH, e.g. by disturbances, the voltage between the rectifying diode D1 and the driving transistor T1 is not high enough to get the current regulator T51 into conduction. As explained with reference to FIG. 3, an asymmetrical load of the bus lines CANH and CANL may appear, because of the delay of the charge/discharge phenomena in diodes. For example, signal may become asymmetric due to the presence of a parasitic current with opposite orientation compared the output current Iout. For example, the parasitic current may be a reverse recovery current Irr in one rectifying diode (e.g. in the upper diode D1), but not in the other diode, depending on whether the voltage of the high CAN line CANH moves above VDD or the voltage of het low CAN line CANL moves below GND during exposure of electromagnetic disturbances simultaneously, or not, which is a usual occurrence. This effect appears mainly during dominant state, or in the transition between states (e.g. from dominant state to recessive state, and/or vice-versa, see FIG. 11).

The CAN bus of FIG. 5 shows a DPI unit 210 for introducing an electromagnetic disturbance 213, for testing the effect thereof. Of course, such DPI unit only needs to be provided for testing purposes; in real life situations the electromagnetic disturbance 213 will occur "by itself", due to e.g. neighboring wires that carry big currents or current changes, or via supply lines of the connected devices, or via any other coupling mechanism. The electromagnetic disturbance 213, in the embodiment illustrated applied via the DPI unit 210, might for instance raise the voltage potential of the high CAN line CANH. The rectifying diode D1 might switch from a conducting state into a non-conducting state, for example according to the diagram shown in FIG. 3. A current component Irr may flow towards supply VDD and raise the voltage of the anode of D1. The current component discharges the junction capacitance of D1, and charges the capacitance of T1. The voltage at the node between D1 and the source of T1 will raise. The bulk of T1 (e.g. the body) is connected to VDD (not shown in the figure), and a parasitic diode forms between source and bulk of T1. A fraction of the current flows over this parasitic diode. A bipolar PNP transistor T51 is connected to the node between D1 and T1, in order to detect these reverse currents. The increase of voltage at the anode of diode D1 brings the bipolar PNP transistor T51, which is biased on its base with a constant voltage source 504 providing a voltage of VDD-VBE, into a conducting mode. In other words, with lifting up the voltage at the node between rectifying diode D1 and the source of driving transistor T1, the bipolar transistor T51 will also be triggered, and the fraction of the reverse recovery current Irr not flowing over the parasitic diode of driving transistor T1 will flow over bipolar transistor T51. This fraction is equal to "a", a<1, and it can be obtained for example by simulation and/or calculations. If the voltage source 504 provides for example 4.3 V, the fraction "a" may be nearly 1, as the parasitic diode may not be triggered.

Thus, a fraction of the reverse recovery current Irr (a*Irr, with a<1) flows to an amplification stage, for example to the transistor T4 of a current mirror 506 formed by two transistors T4 and T3, with a predetermined mirror ratio T4/T3 equal to 1/a. The current is then amplified again in the current mirror T3 and T4 with the factor dependent of a, so that the reverse recovery current Irr is recovered through T3. This current component is introduced, via the diode D2, on the low CAN bus line CANL. This means that both CANH and CANL are loaded with the same additional current component Irr. This enables a symmetric bus load in FIG. 5, allowing compensation of e.g. positive transients.

In some embodiments, the mirror ratio of the current mirror can be controlled, so the current mirror may provide a variable amplification factor. For example, the mirror ratio T4/T3 may be the ratio of Width (W)/Length (L) of the transistors T4 and T3 of the current mirror. If the lengths (L) are equal for both transistors, then the mirror ratio is calculated as W4/W3. The transistor T3 may be a transistor system, including several smaller transistors having the following widths: W31, W32, W33, W34, such that W31+W32+W33+W34=W3. (for example, including several connections that allow choosing different widths). By providing a programmable logic electrically connected to these transistors, the ratio T4/T3 can be controlled.

Other embodiments may provide alternatively or additionally a controllable width of T4. Also alternatively or additionally, the length L3 and/or L4 can be made variable in a similar fashion.

Figure 6:
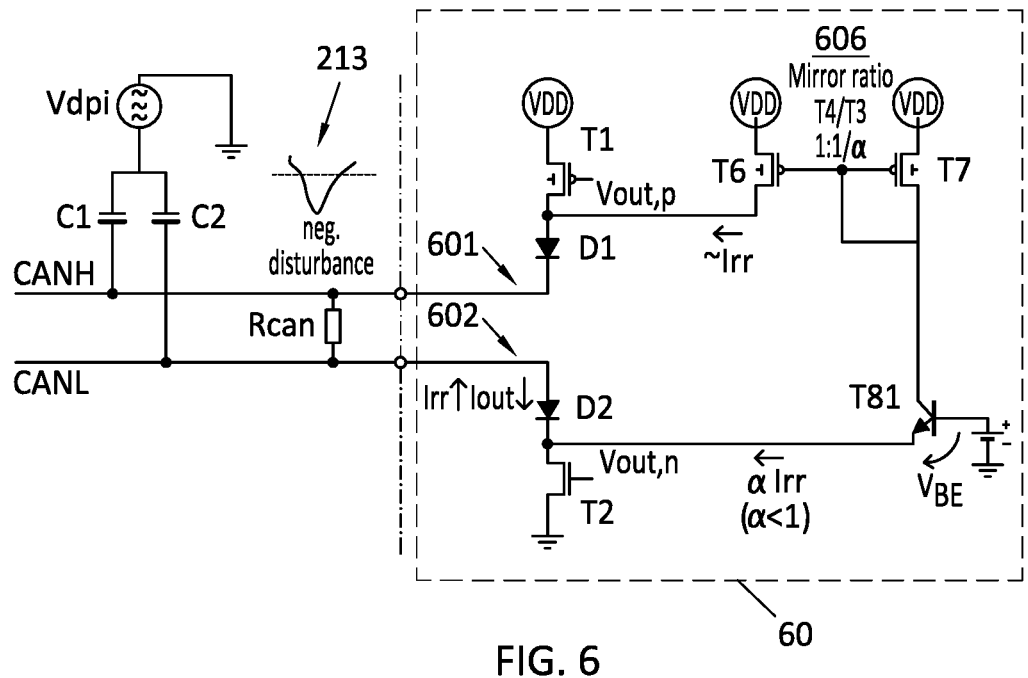
FIG. 6 illustrates a transmitter according to embodiments of the present invention, under exposure of DPI, for compensation of parasitic currents in the low bus line CANL.

Another embodiment of the present invention is the transmitter 60 shown in FIG. 6, which is an analogous implementation as FIG. 5, for compensating for parasitic currents and EM disturbances through the low CAN line CANL, allowing compensation of e.g. negative transients.

Herein, an EM disturbance 213 is again introduced using a DPI. This is an artificial situation for test purposes only; in real life the disturbance is for instance introduced due to interference with other lines. The disturbance might for instance reduce the voltage potential of the low CAN line CANL. The rectifying diode D2 of the second conduction path 602 between drive transistor T2 and low CAN line CANL might consequently switch from a conducting state to a non-conducting state (as shown in FIG. 3). A reverse recovery current component Irr would flow towards GND and would reduce the voltage of the cathode of the diode D2. This brings a bipolar NPN transistor T81, which is biased on its base with a constant voltage source of VBE, into a conducting mode, so that a fraction of reverse recovery current Irr (a*Irr with a<1) flows to the first transistor T7 of a current mirror 606. The current is then amplified again in the current mirror 606 by means of the mirror factor of 1/a, so that transistor T6 carries the reverse recovery current Irr. This current component is introduced, via the diode D1 on the first conductive path 601 between drive transistor T1 and high CAN bus line CANH, to the high bus line CANH. This means that CANH and also CANL are loaded with the same additional reverse recovery current component Irr, which enables a symmetric bus load.

Figure 7:
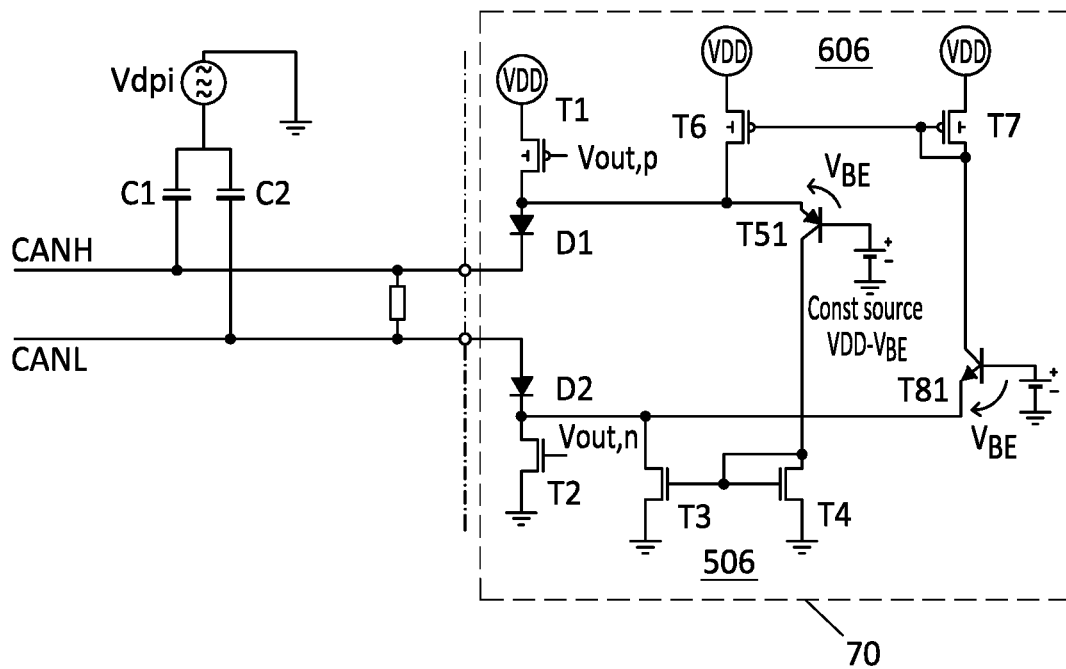
FIG. 7 illustrates a transmitter according to embodiments of the present invention for compensation of parasitic currents in both conduction lines CANH, CANL of the differential bus.

In embodiments of the present invention, a transmitter may include means for compensating for asymmetries introduced by reverse recovery currents in any and both of the conduction paths. For example, FIG. 7 shows a transmitter 70 including a combination of the current regulators of both FIG. 5 and FIG. 6. Such combination provides a robust operation of a transmitter 70, because both compensation circuits are combined into one transmitter 70, which is advantageously robust against positive and negative electromagnetic disturbances on both bus lines CANH and CANL.

The present invention is not limited to the structures and elements of these examples, and any equivalent structure which performs similar operations can be used.

For example, in another embodiment of the present invention, the bipolar transistors T51, T81 can be replaced by metal-oxide-semiconductor-field-effect-transistors (MOSFETs). The function of these transistors is the same as previously described. Exemplary circuits are shown in the transmitters 80, 90, 100 of FIG. 8, FIG. 9 and FIG. 10, respectively. The specific implementation may be industrially driven, for example depending on the available manufacturing plants and/or semiconductor technologies, or depending on the final use of the system. For example, MOSFET implementation can be used when supplying trenches is difficult, or when only a limited number of wells is available; on the other hand, BJT may be used if the use of inverting boost stages is less preferred. MOSFETs usually also present good thermal stability while at the same being very compact.

Figure 8:
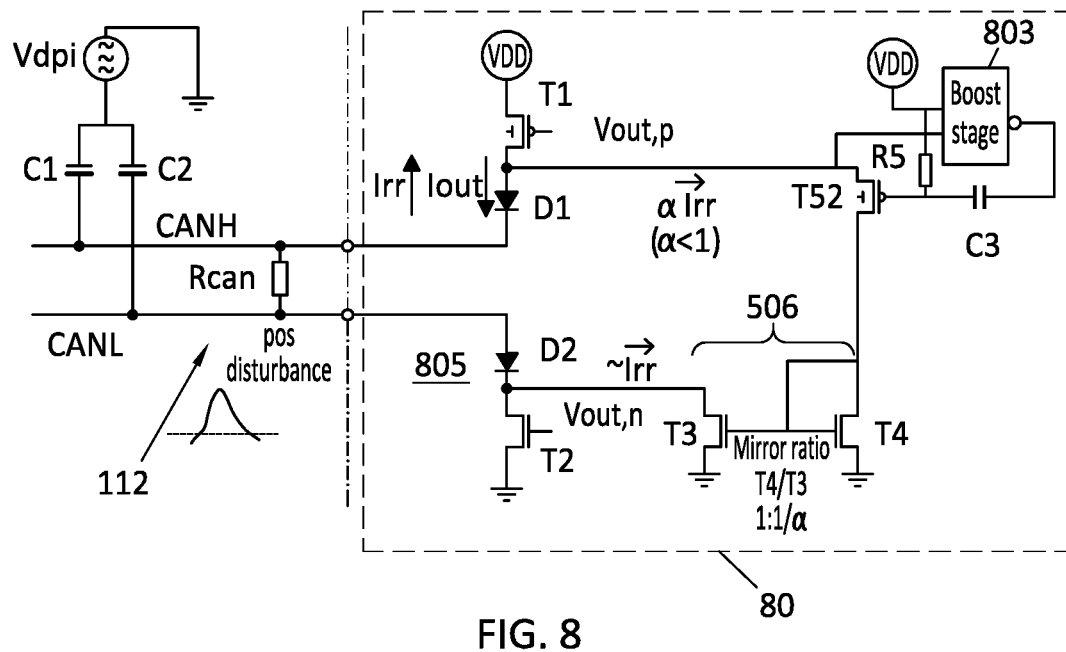
FIG. 8 illustrates a transmitter according to alternative embodiments of the present invention, under exposure of DPI, for compensation of parasitic currents in the high bus line CANH.

For a positive electromagnetic disturbance on the high CAN bus line CANH in FIG. 8, the p-channel transistor T52 is biased on its gate with VDD, via an impedance R5. An included inverting boost stage 803 provides, via a capacitor C3, a negative gate voltage, if the anode voltage of the diode D1 surpasses VDD because of the presence of a reverse recovery current Irr. The transistor T52 switches to conduction and enables a fraction of the reverse recovery current Irr (a*Irr with a<1) to flow towards a transistor T4, part of current mirror 506. The current can be amplified again in the current mirror stage 506 comprising transistors T3 and T4 with a known factor obtained by the mirror ratio, so that T3 carries then also the reverse recovery current Irr. This current component is introduced on the low bus line CANL, via the diode D2 of the second conductive path 805 between the driving transistor T2 and this low CAN bus line CANL. This means that the bus lines CANH and CANL are loaded with the same additional reverse recovery current component Irr, enabling a symmetric bus load in FIG. 8.

Figure 9:
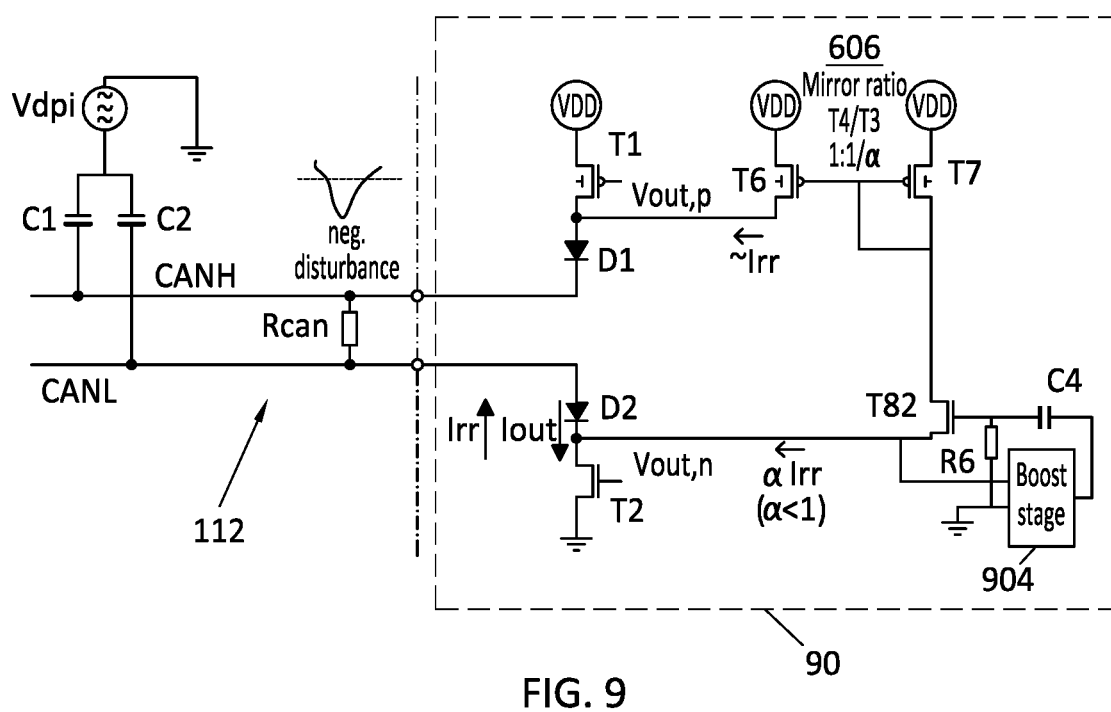
FIG. 9 illustrates a transmitter according to alternative embodiments of the present invention, under exposure of DPI, for compensation of parasitic currents in the low bus line CANL.

Analogously for a negative electromagnetic disturbance on the low CAN bus line CANL in FIG. 9, the n-channel transistor T82 is biased on its gate with GND via the impedance R6. A non-inverting boost stage 904 provides, via the capacitor C4, a positive gate voltage if the cathode voltage of the diode D2 is lower than the GND voltage because of the presence of a reverse recovery current Irr. The transistor T82 will conduct and enable a fraction of the reverse recovery current Irr (a*Irr with a<1) flowing towards transistor T7 of the current mirror 606, which amplifies the current again in the current mirror formed by the transistor couple T6 and T7, with a factor equal to the mirror ratio, so that transistor T6 also carries the reverse recovery current Irr.

As before, the current component is introduced in the high conductive bus line CANH via the diode D1 connected thereto. Thus, the high and the low CAN bus lines CANH and CANL are loaded with the same additional reverse recovery current component Irr, enabling a symmetric bus load in FIG. 9.

Figure 10:
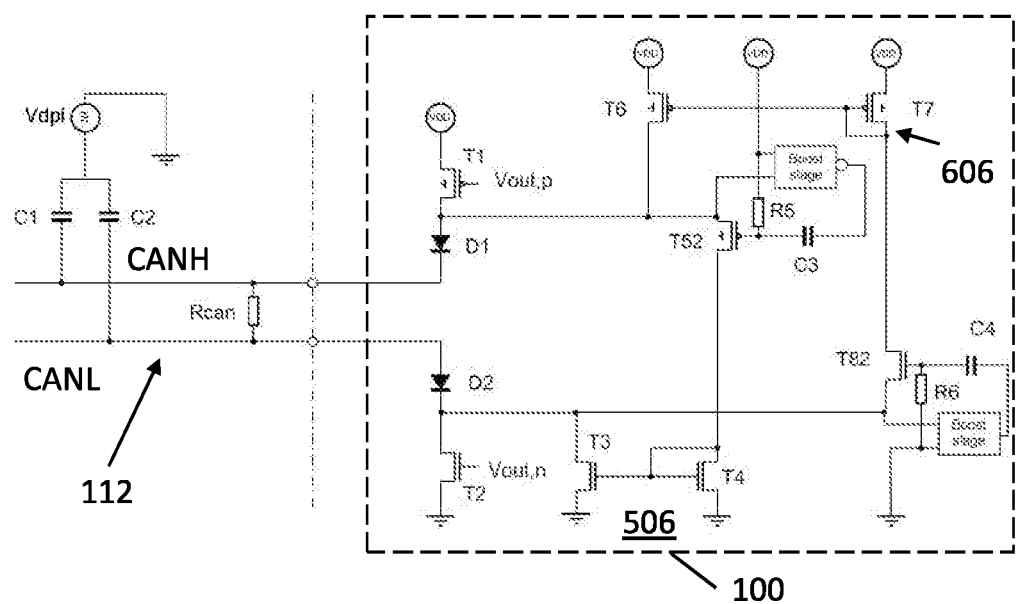
FIG. 10 illustrates a transmitter according to embodiments of the present invention for compensation of parasitic currents in both conduction lines CANH, CANL of the differential bus.

For a robust operation of a transceiving unit, both compensation methods can be combined into one circuit, as shown in the exemplary circuit of FIG. 10. Current asymmetry, due to both positive and negative electromagnetic disturbances on the bus lines CANH and CANL, can be compensated.

The transistors of the mirror stages may be n- or p-channel type, according to their connection to the conduction path to the low or high CAN bus lines CANL, CANH. Accordingly, the current mirror stages, the transistors and boost stages and the driving transistors can advantageously share the same source and/or ground.

In a second aspect, the present invention provides a communication system. The communication system includes a differential communication network, for example a CAN bus 112, including a differential bus for carrying recessive and dominant voltage levels. The system includes at least one transmitter according to embodiments of the first aspect of the present invention. The transmitter may be part of a transceiver unit, which is connected between the communication network and a device in order to establish communication between the network and the device. This increases the flexibility of system design, because it can be used interchangeably for establishing communication between any CAN bus and any device.

In other embodiments, the transmitter (or the transceiver including the transmitter) of the first aspect may be integrated in the device. This increases the compactness of the system. For example, the CAN system of such embodiment can include more intercommunicating devices.

In a third aspect of the present invention, a method is described for compensating asymmetries in the conduction lines of a differential communication bus. The method describes a method of signal transmission which includes steps for compensating for parasitic currents in a transceiver, such as current spikes, particularly high frequency current spikes. For example, the method can be applied to a CAN bus including dominant and recessive bus voltage levels, for increasing the symmetry of the signals.

A method according to embodiments of the third aspect of the present invention is a method for driving a differential communication bus 112 including two conduction lines connected to a first and second conduction paths CANH, CANL of at least one transmitter. The method comprises applying 130 a driving current through each conduction path of the transmitter, thus providing a differential driving signal; obtaining 131 a first current equal to a known ratio of a parasitic current circulating through the first conduction path with a direction inverse to the driving current; optionally upscaling 132 said first current, for instance by taking the inverse of the known ratio, thus obtaining a second current with a magnitude equal to the first current (parasitic current); and introducing 133 the second current into the second conduction path of the transmitter. It is an advantage of embodiments of the third aspect of the present invention that the same current contribution is applied to the second conduction path as to the first conduction path, and hence to the two bus lines CANH, CANL, such that the signal symmetry of the driving signal flowing through the communication bus 112 is increased. This way, the parasitic current from a conduction line is compensated for.

In embodiments of the present invention, the known ratio of the parasitic current may be the complete parasitic current. In this case, the obtained parasitic current is simply applied to the second conduction path. In alternative embodiments, as for instance illustrated in FIG. 5 to FIG. 10, the known ratio of the obtained current value is only a fraction of the actual parasitic current flowing through the first conduction path, and the thus obtained known ratio of the parasitic current is upscaled before being applied 133 to the second conduction path.

The quality of communication between two devices in a differential network depends, among other factors, on the quality of the transmitted signal. For example, in the case of a CAN, it depends on the robustness and symmetry of the signal sent by the transmitter (or transceiver functioning on transmitting mode).

Figure 12:
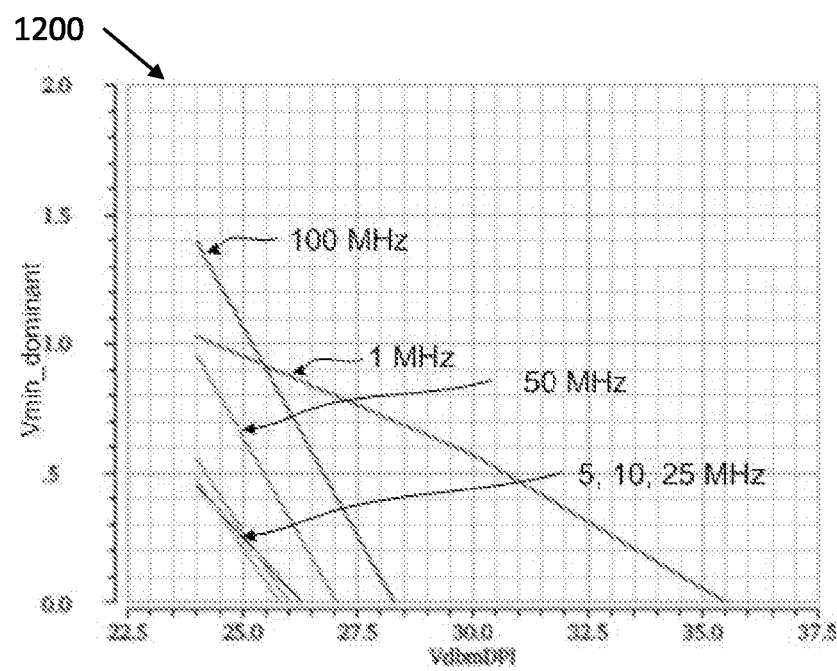
FIG. 12 illustrates the minimum dominant voltage level for a correct operating receiving unit under DPI exposure, without compensation and with compensation for diode reverse recovery current according to embodiments of the present invention.
Figure 12:
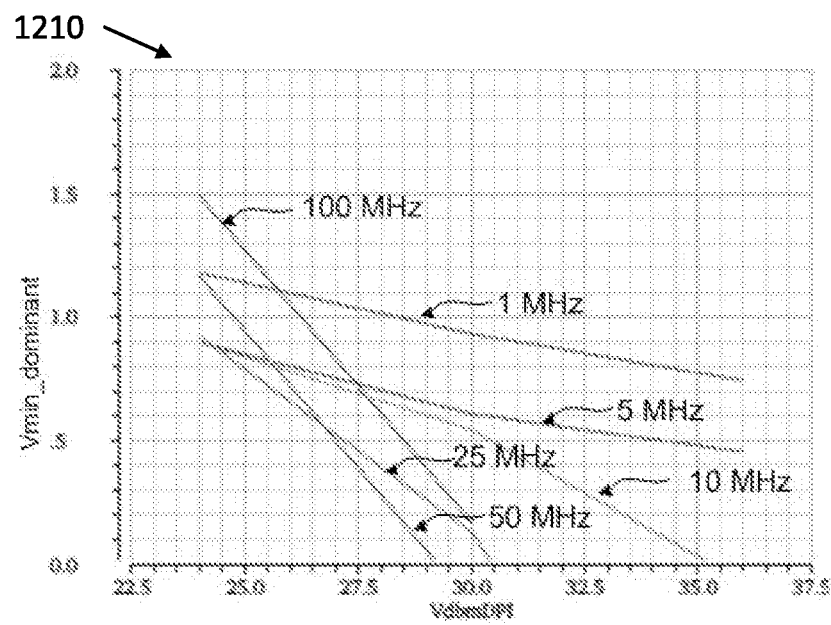
Figure 13:
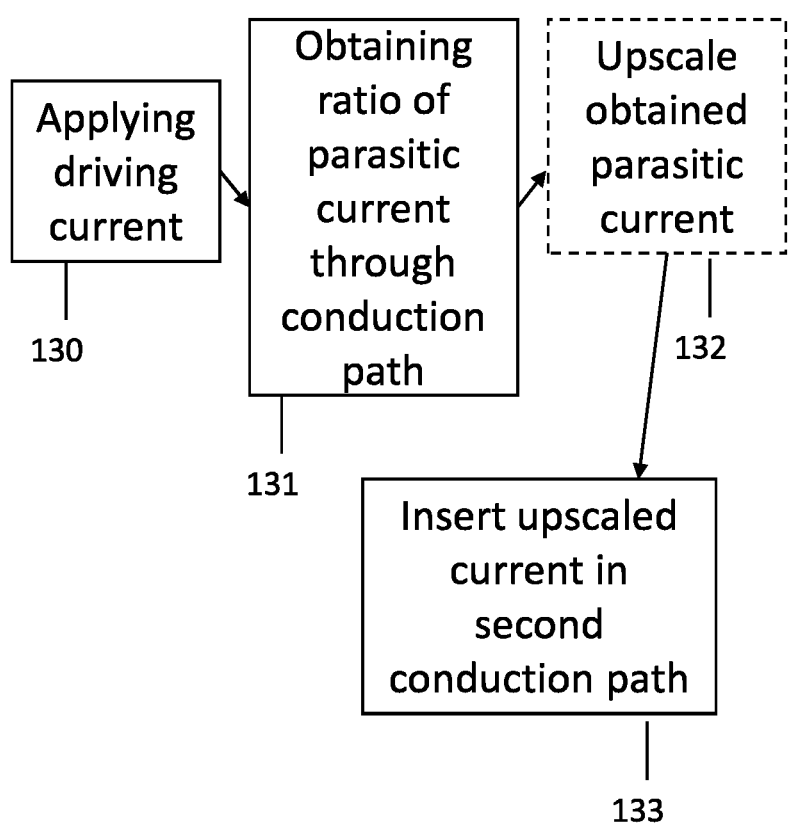
FIG. 13 is a flowchart showing exemplary steps of a method according to embodiments of the present invention.

FIG. 12 shows the required minimum dominant voltage CANH-CANL for the receiver to show a correct operation, according to the lower graphs 400 of FIG. 4, as a function of the coupled energy during DPI exposure for different frequencies.

The upper diagram 1200 shows the minimum dominant voltage in a non-compensated transmitter.

The lower diagram 1210 shows the same, but for the case of a compensated circuit, in this particular example compensated according to the embodiment of FIG. 10.

It can be seen that, when using a compensated transmitter, all traces are shifted to a higher energy level of the DPI exposure, as compared to a non-compensated transmitter.

In particular, for frequencies of 1 MHz, 5 MHz and 10 MHz the minimum dominant voltage improves in a significant manner. This demonstrates that the method and circuit improves robustness of the communication.

For higher frequencies (25 MHz, 50 MHz, 100 MHz), classic filter mechanisms may be applied.

Some of these filter mechanisms cannot be used for the lower frequencies, as they would harm the functioning of the high speed CAN bus, which in some implementations may request a dominant state of at least 200 ns, which is equivalent to a baud rate of 5 MBit/s.

The present invention allows removing the influence of the asymmetrical load of the bus lines because of the presence of the reverse recovery current Irr in one diode, by introducing an additional current, of the same magnitude as the reverse recovery current Irr, to the path in which the other diode is located. This will enable again a symmetric load of the high and low bus lines CANH, CANL and might keep the voltage levels for the receiver in the specified range. This process can be made advantageously autonomous: the additional current is generated as a reaction to the presence of the reverse recovery current Irr, with no need to activate the compensation means externally. Further, embodiments of the present invention may obtain compensation of parasitic currents in a sensor-less implementation, with no need to include current sensors or other complex systems such as transconductance elements and/or amplification stages.

The invention claimed is:

1. A transmitter for establishing communication between a device and a differential network bus, the differential network bus comprising two conduction lines connected to each of a first and second conduction paths of the transmitter, the transmitter further including
    current driving means connected to each conduction line of the differential network bus, through the first and second conduction paths of the transmitter, the current driving means adapted to introduce a driving current through each of the first and second conduction path of the transmitter, thus providing a differential driving signal,
    at least one unidirectional current regulator for extracting a first current,
    wherein the at least one unidirectional current regulator is adapted to extract a first current being equal to a known ratio of a parasitic current circulating through the first conduction path with a direction inverse to the driving current through the first conduction path connected to a conduction line of the differential bus, the transmitter further including means for obtaining, from said first current, a second current with a magnitude equal to a magnitude of the parasitic current, means for introducing the second current into the second conduction path connected to the other line of the differential bus, for compensating the parasitic current of the first conduction path, wherein at least one conduction path comprises at least one rectifying device for reducing reverse currents flowing to the current driving means.

2. The transmitter according to claim 1, wherein the means for obtaining, from said first current, the second current, comprises means for scaling said first current by multiplication of the first current by the inverse of the known ratio.

3. The transmitter according to claim 2, wherein the means for scaling and introducing the extracted current into the conduction path comprises at least a current mirror.

4. The transmitter according to claim 1, wherein the at least one unidirectional current regulator comprises a BJT.

5. The transmitter according to claim 1, wherein the at least one unidirectional current regulator comprises a MOSFET and a boost stage.

6. A transceiver comprising a transmitter according to claim 1.

7. A communication system comprising at least a differential communication network, further comprising a transmitter according to claim 1.

8. A method for driving a differential communication bus including two conduction lines connected to each of a first and second conduction paths of at least one transmitter, the method comprising:

applying a driving current through each conduction path of the transmitter, thus providing a differential driving signal, wherein the method further comprises obtaining a first current equal to a known ratio of a parasitic current circulating through the first conduction path with a direction inverse to the driving current, obtaining, from said first current, a second current with a magnitude equal to a magnitude of the parasitic current, introducing the second current into at least the second conduction path of the transmitter, for compensating the parasitic current of the first conduction path, wherein applying a driving current comprises applying a driving current through a rectifying device being connected to any or both the conduction paths.

9. The method according to claim 8, wherein obtaining the second current from the first current comprises upscaling the first current by multiplying it with the inverse of the known ratio.

10. The method according to claim 9, wherein multiplying the first current comprises introducing the first current into at least one current mirror with a mirror ratio equal to the inverse of the known ratio.

11. The method according to claim 8, wherein introducing the second current into the at least second conduction path comprises injecting the current at the cathode of a rectifying device connected to the at least second conduction path.

12. The method according to claim 8, for compensating current spikes at frequencies between 1 MHz and 25 MHz.

* * * * *